(12) United States Patent
Spyche, Jr.

(10) Patent No.: US 10,626,967 B2
(45) Date of Patent: Apr. 21, 2020

(54) MECHANICAL SPRING ACTUATOR

(71) Applicant: KYNTEC CORPORATION, Cheektowaga, NY (US)

(72) Inventor: Gerald J Spyche, Jr., Orchard Park, NY (US)

(73) Assignee: KYNTEC CORPORATION, Cheektowaga, NY (US)

( * ) Notice: Subject to any disclaimer, the term of this patent is extended or adjusted under 35 U.S.C. 154(b) by 587 days.

(21) Appl. No.: 15/228,051

(22) Filed: Aug. 4, 2016

(65) Prior Publication Data

US 2017/0051814 A1 Feb. 23, 2017

Related U.S. Application Data

(60) Provisional application No. 62/200,774, filed on Aug. 4, 2015.

(51) Int. Cl.
| | | |
|---|---|---|
| *F16H 25/24* | (2006.01) | |
| *H02K 7/06* | (2006.01) | |
| *B60G 13/02* | (2006.01) | |
| *B60G 15/04* | (2006.01) | |
| *B60G 15/06* | (2006.01) | |
| *F16F 13/00* | (2006.01) | |
| *B60N 2/90* | (2018.01) | |
| *F16H 25/20* | (2006.01) | |

(52) U.S. Cl.
CPC ......... *F16H 25/2454* (2013.01); *B60G 13/02* (2013.01); *B60G 15/04* (2013.01); *B60G 15/061* (2013.01); *B60N 2/929* (2018.02); *F16F 13/005* (2013.01); *F16F 13/007* (2013.01); *F16H 25/20* (2013.01); *H02K 7/06* (2013.01); *B60G 2202/20* (2013.01); *F16F 2228/08* (2013.01); *F16F 2232/06* (2013.01)

(58) Field of Classification Search
CPC .............................. F16H 25/2454; F16H 25/20
See application file for complete search history.

(56) References Cited

U.S. PATENT DOCUMENTS 2,141,697 A    12/1938  Russell
2,804,054 A *  8/1957  Geyer ................... F15B 15/264
                                                        92/17

(Continued)

FOREIGN PATENT DOCUMENTS

EP    1835110 A2    9/2007

*Primary Examiner* — William Kelleher
*Assistant Examiner* — Gregory T Prather
(74) *Attorney, Agent, or Firm* — Bond, Schoeneck & King, PLLC (57) ABSTRACT

A linear actuator comprising a housing with a proximal end and a distal end, the housing defining a central cavity extending axially through the housing; a piston tube, where a first portion of the piston tube is slidably positioned axially in the housing, and a second portion of the piston tube extends outwardly from the distal end of the housing; an elongated rotatable screw positioned axially within the central cavity of the housing; a nut positioned within the housing and mounted about the screw, the nut configured to move axially within the housing as the screw rotates; and a spring positioned around the screw, the spring positioned within the housing between the nut and the piston tube; wherein the spring is configured to bias the piston tube away from the nut.

15 Claims, 5 Drawing Sheets

(56) References Cited

U.S. PATENT DOCUMENTS

| | | | |
|---|---|---|---|
| 2,908,491 A | 10/1959 | Suozzo | |
| 4,251,064 A | 2/1981 | Camilleri | |
| 5,398,780 A * | 3/1995 | Althof | B64D 41/007 |
| | | | 185/39 |
| 5,832,779 A * | 11/1998 | Madrid | F16H 25/20 |
| | | | 74/89.39 |
| 2010/0162838 A1 * | 7/2010 | Hirai | F16H 25/2454 |
| | | | 74/89.33 |
| 2012/0160043 A1 * | 6/2012 | Drumm | F16H 25/20 |
| | | | 74/89.23 |
| 2012/0234117 A1 * | 9/2012 | Oswald | E21B 41/0007 |
| | | | 74/89.39 |
| 2013/0133512 A1 * | 5/2013 | Mueller | F16H 25/20 |
| | | | 92/110 |
| 2016/0025199 A1 * | 1/2016 | Boone | F16H 25/2204 |
| | | | 74/89.38 |
| 2018/0273123 A1 * | 9/2018 | Eberlberger | B62K 19/36 |
| 2018/0297571 A1 * | 10/2018 | Sprocq | B60T 13/745 |

\* cited by examiner

MECHANICAL SPRING ACTUATOR

CROSS REFERENCE TO RELATED APPLICATIONS

This application claims priority to U.S. Provisional Patent Application Ser. No. 62/200,774, filed on Aug. 4, 2015 and entitled "Mechanical Spring Actuator," the entire disclosure of which is incorporated herein by reference.

FIELD OF THE INVENTION

The present disclosure is directed generally to a mechanical linear actuator, and more specifically to a mechanical linear actuator that can adjust the actuation load as a function of an object's weight.

BACKGROUND

A linear actuator is an actuator that creates motion in a straight line, unlike a conventional electric motor that creates a circular motion. Linear actuators are commonly used in a wide variety of applications, including but not limited to positioning a seat such as an aircraft or automotive passenger seat, mitigating blast seat shock, position locking, or in any system that requires mechanical actuation, among many other applications.

Existing linear actuators, however, function largely the same regardless of the weight of the object that they are moving or positioning. Thus, existing linear actuators do not consider or adequately respond to the weight of the object. Accordingly, there is a need in the art for a mechanical linear actuator that can adjust the actuation load as a function of an object's weight.

SUMMARY OF THE INVENTION

The present disclosure is directed to inventive mechanical linear actuators. The inventive mechanical linear actuators provide a mechanism for positioning a seat of, for example, an aircraft or automobile, through linear motion. The mechanical linear actuators can also be used with any other machine or mechanism requiring load adjustment, shock mitigation, or controlled rate positioning. For example, the linear actuator can be configured to adjust the actuation load as a function of the seat occupant's, or other object's, weight. Additionally, the mechanical linear actuator may include a hydraulic component to control forces acting on the device or potentially energy stored by the device and, consequently, control the speed of actuation. Devices without a hydraulic component can rely on coulombic damping, mechanical damping in which energy is absorbed via sliding friction, at, for example, the screw/nut interface to control the speed of actuation. The linear actuator disclosed or otherwise envisioned herein may also include a mechanical lock to retain the linear actuator at any portion of stroke to hold an associated seat mechanism or other mechanism in a desired position. The linear actuator may also include an adjustable locking collar to adjust the stroke and bottoming positions of the device.

Generally, in one aspect, a linear actuator is provided. The linear actuator includes: (i) a housing with a proximal end and a distal end, the housing defining a central cavity extending axially through the housing; (ii) a piston tube, wherein a first portion of the piston tube is slidably positioned axially in the housing, and a second portion of the piston tube extends outwardly from the distal end of the housing; (iii) an elongated rotatable screw positioned axially within the central cavity of the housing; (iv) a nut positioned within the housing and mounted about the screw, wherein the nut is configured to move axially within the housing as the screw rotates; and (v) a spring positioned around the screw, the spring positioned within the housing between the nut and the piston tube, wherein the spring is configured to bias the piston tube away from the nut.

According to an embodiment, the rotatable screw comprises a plurality of threads on its outer surface, and the cylindrical nut comprises a plurality of threads on its inner surface, the screw threads and the nut threads configured to be complementary to each other.

According to an embodiment, the linear actuator further comprises an adjustment knob mounted on and extending into the housing, wherein the knob is configured to interface with the screw and enable rotation of the screw. According to an embodiment, the adjustment knob and the screw interface using a gear coupled to the knob and a gear coupled to the screw.

According to an embodiment, the piston tube comprises a hydraulic component, the hydraulic component comprising a piston rotatably coupled to the screw.

According to an embodiment, the linear actuator further includes a mechanical lock.

According to an embodiment, the linear actuator further includes a first retainer comprising a proximal end and a distal end, wherein the first retainer is positioned within the housing between the spring and the piston tube, the first retainer defining an opening configured to receive the spring therethrough to retain the spring at its distal end. According to an embodiment, the linear actuator further includes a second retainer comprising a proximal end and a distal end, wherein the second retainer is positioned within the housing and around the screw; and a second spring positioned around the screw, the second spring positioned within the housing between the proximal end of the housing and the second retainer; wherein the second spring is configured to bias the second retainer away from the proximal end of the housing, and wherein the second retainer is configured to interface with an outer wall of a proximal end of the first retainer to enable the first retainer to exert a force on the second spring.

According to an embodiment, the linear actuator further includes a spline positioned about the screw and configured to selectively allow rotation of the screw.

According to another aspect, another embodiment of the linear actuator is provided. The linear actuator includes: (i) a housing comprising a proximal end and a distal end, and defining a central cavity extending axially through the housing; (ii) a piston tube, wherein a first portion of the piston tube is slidably positioned axially in the housing, and a second portion of the piston tube extends outwardly from the distal end of the housing; (iii) an elongated rotatable screw positioned axially within the central cavity of the housing; (iv) a cylindrical nut positioned within the housing and mounted about the screw, wherein the nut is configured to move axially within the housing as the screw rotates; (v) a first spring positioned around the screw, the spring positioned within the housing between the nut and the piston tube, wherein the spring is configured to bias the piston tube away from the nut; (vi) a first retainer comprising a proximal end and a distal end, wherein the first retainer is positioned within the housing between the spring and the piston tube, the first retainer defining an opening configured to receive the spring therethrough to retain the spring at its distal end; (vii) a second retainer comprising a proximal end and a distal end, wherein the second retainer is positioned within the housing and around the screw; and (viii) a second spring positioned around the screw, the second spring positioned within the housing between the proximal end of the housing and the second retainer, wherein the second spring is configured to bias the second retainer away from the proximal end of the housing, and wherein the second retainer is configured to interface with an outer wall of a proximal end of the first retainer to enable the first retainer to exert a force on the second spring.

According to another aspect, another embodiment of the linear actuator is provided. The linear actuator includes: (i) a housing comprising a proximal end and a distal end, and defining a central cavity extending axially through the housing, wherein the housing further comprises a first opening to the central cavity and second opening to the central cavity, wherein the first and second openings are located at the proximal end of the housing; (ii) a piston tube, wherein a first portion of the piston tube is slidably positioned axially within the central cavity, and a second portion of the piston tube extends outwardly from the distal end of the housing; (iii) a first elongated rotatable screw positioned axially within the central cavity of the housing; (iv) a first cylindrical nut positioned within the central cavity of the housing and mounted about the first screw, wherein the nut is configured to move axially within the central cavity of the housing as the first screw rotates; (v) a second elongated rotatable screw positioned axially within the central cavity of the housing; (vi) a second cylindrical nut positioned within the central cavity of the housing and mounted about the second screw, wherein the nut is configured to move axially within the central cavity of the housing as the second screw rotates; (vii) a spring positioned within the central cavity of the housing and around the second screw between the second nut and the distal end of the housing, wherein the spring is configured to bias the second nut away from the distal end of the housing.

According to an embodiment, the linear actuator further includes gears coupled to the first and screw and the second screw, wherein the gears are configured to enable concurrent rotation of the first screw and the second screw.

According to an embodiment, the linear actuator further includes a spline positioned about either the first screw or the second screw, the spline configured to selectively allow rotation of the first and second screws.

These and other aspects and embodiments of the invention will be described in greater detail below, and can be further derived from reference to the specification and figures.

BRIEF DESCRIPTION OF THE DRAWINGS

The present invention will be more fully understood and appreciated by reading the following Detailed Description of Embodiments in conjunction with the accompanying drawings.

DETAILED DESCRIPTION OF EMBODIMENTS

The present disclosure describes various embodiments of a mechanical linear actuator providing a mechanism for positioning a seat of, for example, an aircraft or automobile, through linear motion, including a mechanism that accounts for the weight of the person or object being positioned. According to an embodiment, therefore, is a linear actuator that may include a mechanical lock to retain the linear actuator at any portion of stroke to hold an associated seat mechanism or other mechanism in a desired position. The linear actuator may also include an adjustable locking collar to adjust the stroke and bottoming positions of the device. The mechanical linear actuator can also be used with any other machine or mechanism requiring load adjustment, shock mitigation, or controlled rate positioning, among other uses.

According to an embodiment, the various embodiments of the mechanical linear actuator may include a hydraulic component to control forces acting on the device or potentially energy stored by the device and, consequently, control the speed of actuation. Devices without a hydraulic component can rely on coulombic damping, mechanical damping in which energy is absorbed via sliding friction, at, for example, the screw/nut interface to control the speed of actuation. Many other configurations are possible.

Figure 1:
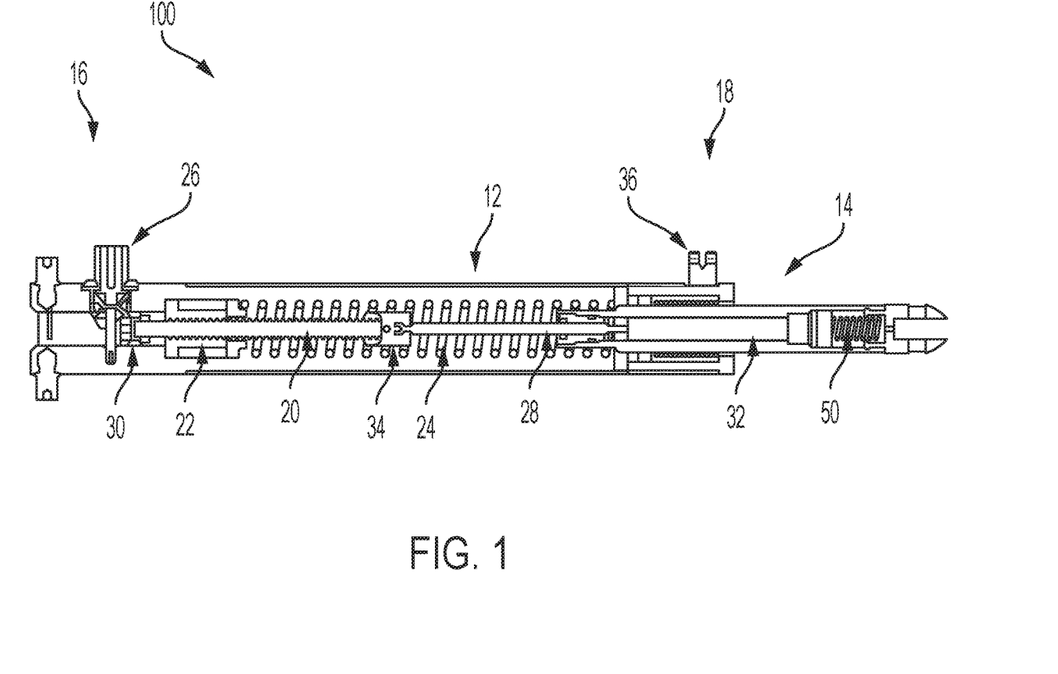
FIG. 1 is a schematic representation of a cutaway view of a linear actuator, in accordance with an embodiment.

Referring now to the drawings, wherein like reference numerals refer to like parts throughout, there is seen in FIG. 1 a cutaway view of a linear actuator 100. The linear actuator comprises a housing 12 and a piston tube 14. The housing comprises a proximal end 16 and a distal end 18, and defines a central cavity that extends axially through the housing. When assembled, piston tube 14 is partially positioned within the central cavity of the housing 12, and partially extends from the opening in the housing at the distal end 18 of the housing. Piston 28 of the linear actuator is slidable within the central cavity of the housing.

Linear actuator 100 also comprises a screw 20 positioned within the housing 12. The screw is threaded on its outer surface. The linear actuator also comprises a nut 22 positioned within the housing, which according to an embodiment can be cylindrical among other shapes. The nut 22 is mounted about the screw 20 and includes a thread (e.g., single or multiple start, or any type of thread profile) on the inner surface of the nut, which is complementary to the threading on the screw 20 in order to enable the nut to move axially within the housing as the screw rotates.

Linear actuator 100 also comprises a spring 24 positioned within the housing about the screw 20 and between the nut 22 and a portion of the piston tube 14. The spring acts to bias the piston tube away from the nut. Rotation of the screw 20 in a first direction can move the nut 22 in the direction of the piston tube, therefore increasing the pre-load force of the spring on the piston tube. Rotation of the screw 20 in an opposite, second direction can move the nut away from the piston tube, therefore decreasing the pre-load force of the spring on the piston tube.

According to an embodiment, the linear actuator 100 also comprises an adjustment knob 26 which is mounted on and extends into the housing 12. The adjustment knob interfaces the screw though the use of gears or a direct drive, enabling rotation of the screw 20 using the knob. The adjustment knob may be controlled either mechanically or electronically by an external component reacting to the weight of an occupant of the seat, for example. According to an embodiment, if gears 30 are used as the interface between the knob and the screw, such gears can be, for example, bevel, worm, or helical gears, and can be of an appropriate gear ratio to achieve a desired nut travel and preload. Many other types of gears are possible.

According to an embodiment, the linear actuator 100 also comprises a hydraulic dampening component 32 having a piston rotatably coupled to the screw. A free-rotating coupling 32 between the screw and the piston allows for rotation of the screw and linear translation of the piston within the hydraulic dampening component 32, where the rotation of the screw does not affect the hydraulic component. According to an embodiment, the hydraulic system of the linear actuator 100 can also comprise an accumulator 50. The accumulator can be a thermal and/or rod accumulator.

According to an embodiment, the linear actuator 100 can also comprise a mechanical lock 36 to retain the linear actuator at any portion of stroke to hold an associated seat mechanism or other mechanism in a desired position.

Figure 2:
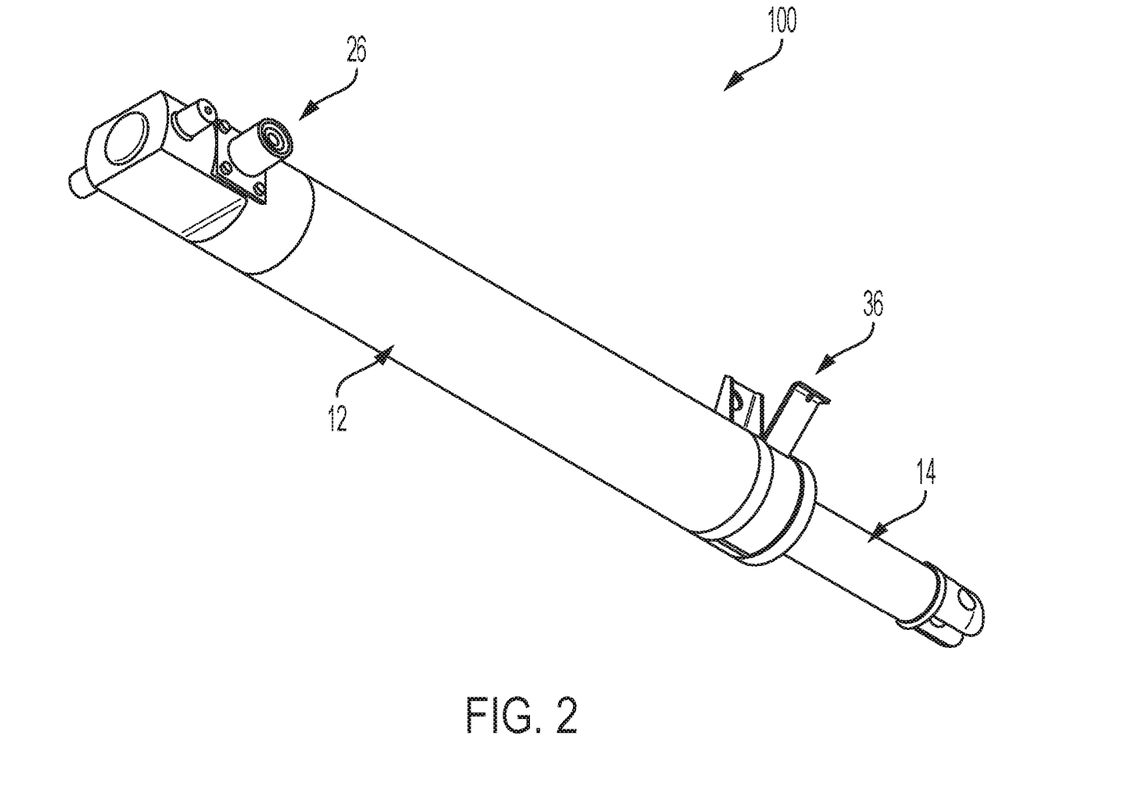
FIG. 2 is a schematic representation of a linear actuator, in accordance with an embodiment.

Referring to FIG. 2, according to an embodiment, is an outside view of the linear actuator 100 of FIG. 1. The linear actuator comprises a housing 12 and a piston tube 14 extending from the distal end of the housing. Also shown are an adjustment knob 26, and a lock 36.

Figure 3:
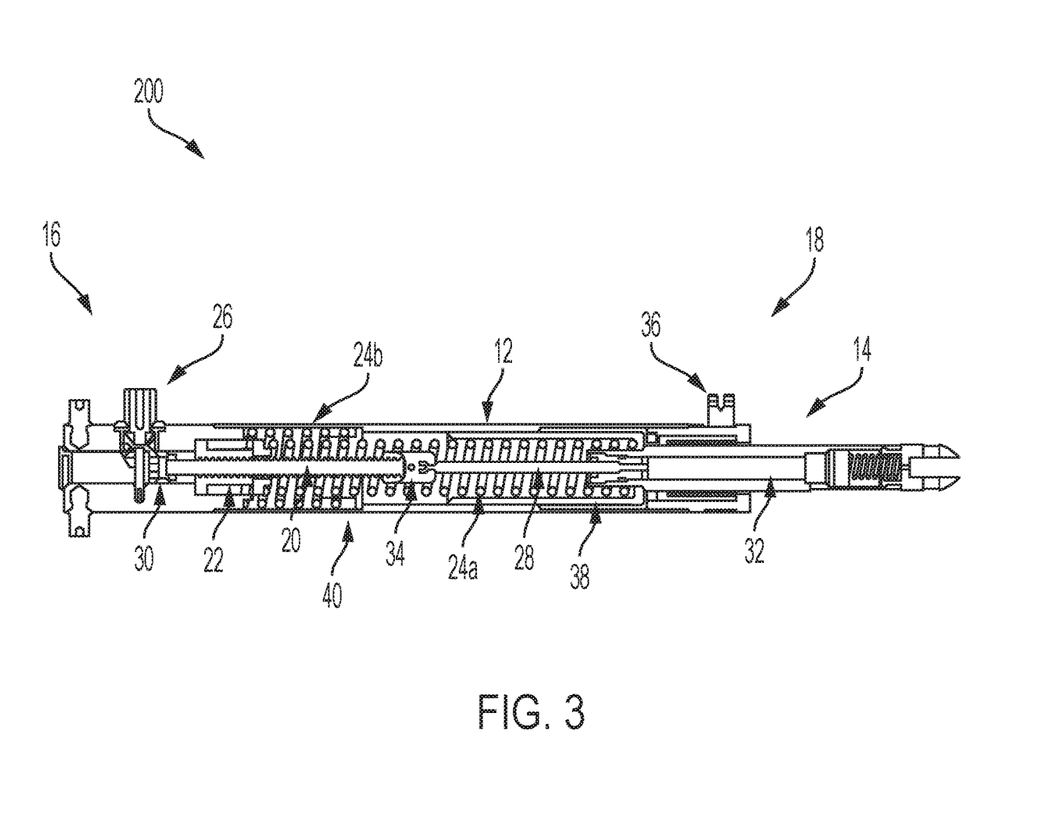
FIG. 3 is a schematic representation of a cutaway view of a linear actuator, in accordance with an embodiment.

Referring to FIG. 3, in one embodiment, is a cutaway view of a linear actuator 200. The linear actuator comprises a housing 12 and a piston tube 14. The housing comprises a proximal end 16 and a distal end 18, and defines a central cavity that extends axially through the housing. When assembled, piston tube 14 is partially positioned within the central cavity of the housing 12, and partially extends from the opening in the housing at the distal end 18 of the housing. Piston 28 of the linear actuator is slidable within the central cavity of the housing.

This embodiment of the linear actuator comprises a first spring 24*a*, but also includes a second spring 24*b*. The linear actuator 200 also comprises a first spring retainer 38 and a second spring retainer 40, which allow for bifurcated action. It should be noted that trifurcation or any combination of changing spring rate vs. stroke can be achieved according to the same principles. The first retainer 38 is positioned within the housing 12 between the first spring 24*a* and the piston tube 14. The first retainer receives the spring 24*a* in an opening in the first retainer and retains the first spring at the first retainer's distal end. As shown, the spring still is able to exert a force on the piston tube via the first retainer.

The second retainer 40 comprises proximal and distal ends and is positioned in the housing 12 about the screw 20. The second spring 24*b* is positioned in the housing 12 about the screw, between the proximal end 16 of the housing and the second retainer 40. The second spring biases the second retainer away from the proximal end of the housing. The second retainer can interface with the outer wall of the proximal end of the first retainer, thus enabling the piston tube to exert a force on the second spring via the first retainer.

According to an embodiment, a force exerted on the piston tube 14 causes the first spring to compress and, thus, causes the piston tube and first retainer 38 to move axially within the opening of the housing toward the proximal end of the housing. As the outer wall of the proximal end of the first retainer 38 reaches the second retainer 40, continued force causes the second spring to compress (in addition to the first spring) and, thus, causes the piston tube, first retainer, and second spring to move axially within the opening of the housing toward the proximal end of the housing. Because both springs are being compressed, the force needed to stroke the piston tube near the end of its stroke is greater than the force needed at the beginning of its stroke when only the first spring is being compressed.

Figure 4:
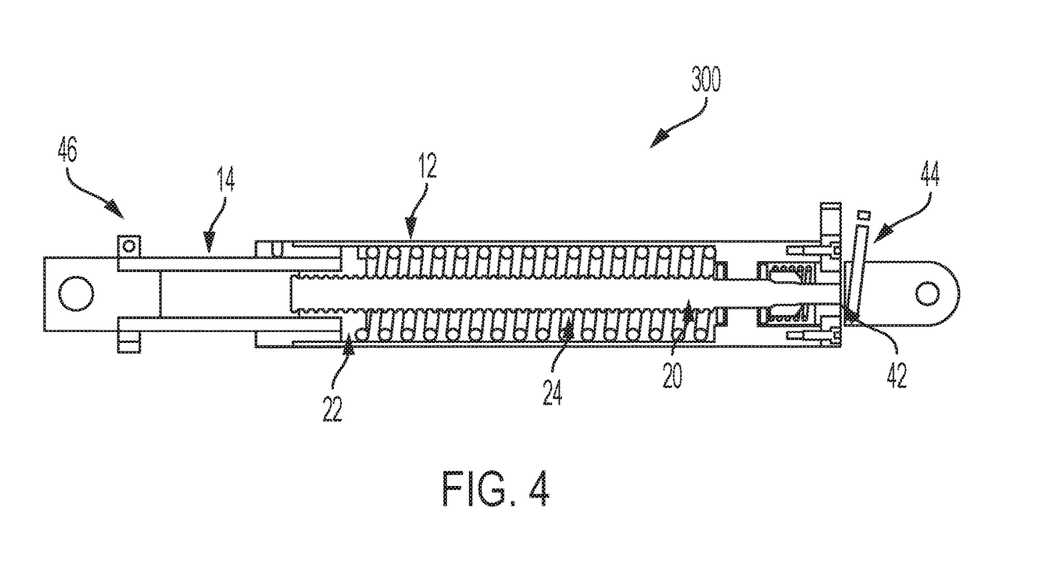
FIG. 4 is a schematic representation of a cutaway view of a linear actuator, in accordance with an embodiment.

Referring to FIG. 4, in one embodiment, is a cutaway view of a linear actuator 300. The linear actuator comprises a housing 12 and a piston tube 14. The housing defines a central cavity that extends axially through the housing. When assembled, piston tube 14 is partially positioned within the central cavity of the housing 12, is slidable, and partially extends from the opening in the housing at the distal end of the housing. The screw 20, which is threaded on its outer surface, is elongated and rotatable and is positioned axially in the housing. The nut 22 of the linear actuator 300 is cylindrical and is positioned in the housing adjacent to the piston tube 14. The nut 22 is mounted about the screw and includes a thread on the inner surface. The thread of the nut mates with the thread of the screw to enable the nut to move axially within the housing as the screw rotates. The screw threads can be any type and can include any number of starts. The spring 24 of the linear actuator 300 is positioned within the housing, about the screw, and between the nut and the proximal end of the housing. The spring acts to bias the nut, and therefore the piston tube, away from the proximal end of the housing.

According to an embodiment, the linear actuator 300 comprises a spline 42 positioned around the screw 20 and configured to selectively allow rotation of the screw using a lock/release lever 44, or similar component for controlling the spline. When the spline is engaged with the screw, the spine prevents rotation of the screw and, thus, the nut is not able to move axially within the housing. When the spline is not engaged with the screw, the screw is able to rotate, thus allowing the nut to move axially within the housing. During such movement, the spring provides a resistive force in the direction of spring compression, and an assisting force in the direction of spring extension. The device can also provide coulombic friction damping (or any other form of damping) at the screw/nut interface to help control the speed of actuation. The linear actuator may also include an adjustable locking collar 46 to adjust the stroke and bottoming positions of the device.

Figure 5:
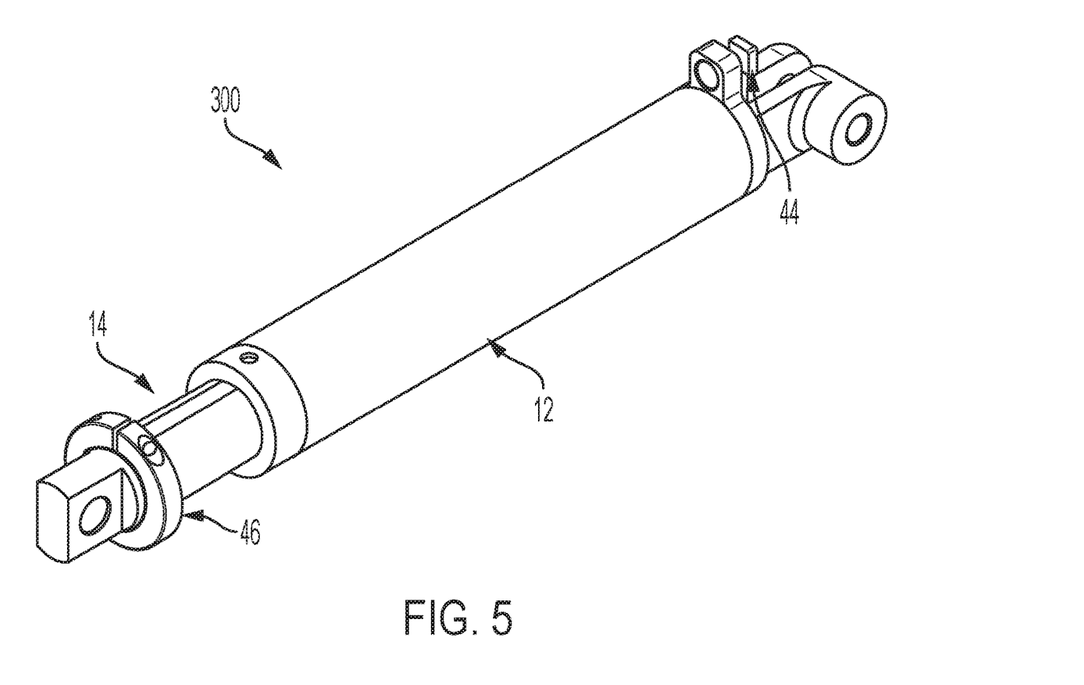
FIG. 5 is a schematic representation of a linear actuator, in accordance with an embodiment.

Referring to FIG. 5, according to an embodiment, is an outside view of the linear actuator 300 of FIG. 4. The linear actuator 300 comprises a housing 12 and a piston tube 14 extending from the distal end of the housing. Also shown are a lock/release lever 44 and an adjustable locking collar 46.

Figure 6:
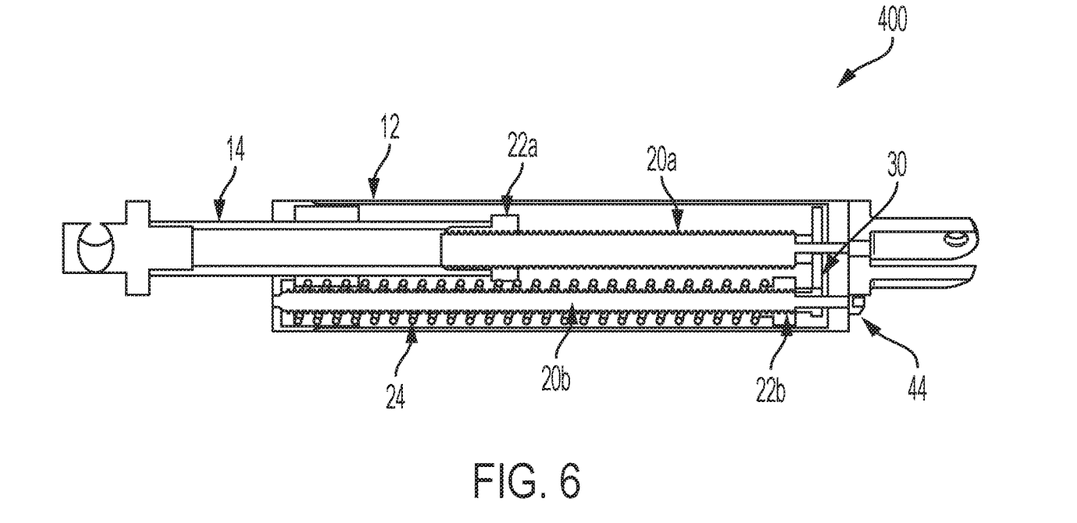
FIG. 6 is a schematic representation of a cutaway view of a linear actuator, in accordance with an embodiment.
Figure 7:
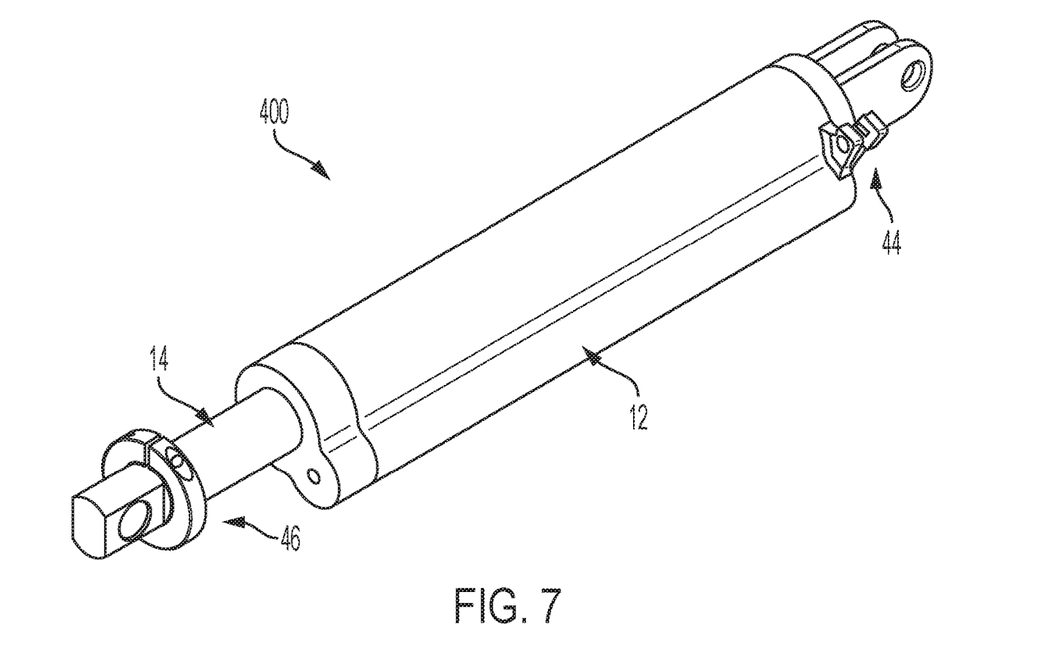
FIG. 7 is a schematic representation of a linear actuator, in accordance with an embodiment.

Referring to FIG. 6, in one embodiment, is a cutaway view of a linear actuator 400. The linear actuator comprises a housing 12 and a piston tube 14. The housing defines a central cavity that extends axially through the housing. When assembled, piston tube 14 is partially positioned within the central cavity of the housing 12, is slidable, and partially extends from the opening in the housing at the distal end of the housing.

According to an embodiment, linear actuator 400 comprises a first screw 20*a* and a second screw 20*b*. The first screw 20*a* is elongated and rotatable and is positioned axially in the first opening of the housing. The first screw 20*a* includes a thread on the outer surface of the first screw. A first nut 22*a* is cylindrical and is positioned in the first opening of the housing adjacent to the piston tube. It is mounted about a screw 20 of the linear actuator and includes a thread on its inner surface. The thread of the first nut 22*a* mates with the thread of the first screw 20*a* to enable the first nut to move axially within the first opening of the housing as the first screw rotates. The screw threads can be of any pitch and can include any number of starts.

The second screw 20b is elongated and rotatable and is positioned axially in the second opening of the housing. The second screw includes a thread on the outer surface of the second screw. A second nut 22b of the linear actuator is cylindrical and is positioned in the second opening of the housing. It is mounted about the second screw 20b and includes a thread on its inner surface. The thread of the second nut 22b mates with the thread of the second screw 20b to enable the second nut to move axially within the second opening of the housing as the second screw rotates. The screw threads can be of any pitch and can include any number of starts.

According to an embodiment, the spring 24 of the linear actuator 400 is positioned in the second opening of the housing, about the second screw 20b, and between the second nut 22b and the distal end of the housing. The spring 24 acts to bias the second nut away from the distal end of the housing. The gears 30 are coupled to the first and second screws, therefore enabling concurrent rotation of the screws.

According to an embodiment, the linear actuator 400 can also include a spline positioned about either the first or the second screw and configured to selectively allow rotation of the screws using a lock/release lever, or similar component for controlling the spline. When the spline is engaged, the spine prevents rotation of the screws and, thus, the nuts are not able to move axially within the housing. When the spline is not engaged, the screws are able to rotate, thus allowing the nuts to move axially within the housing. During such movement, the spring provides a resistive force in the direction of spring compression, and an assisting force in the direction of spring extension.

According to an embodiment, the linear actuator 400 can also provide coulombic friction damping (or any other type of damping) at both screw/nut interfaces to help control the speed of actuation. The gears can be of any type, including, for example, worm, spur, or helical gears. The ratios between the gears coupled to the first and second screws can be designed to allow a relatively lesser spring force to create a relatively larger output force on the piston tube (e.g., a 5-to-1 gear size ratio from first-spring to second-spring). It should be understood that the ratio between the gears can be of any ratio designed to obtain a desired output or mechanical advantage.

Although the present invention has been described in connection with a preferred embodiment, it should be understood that modifications, alterations, and additions can be made to the invention without departing from the scope of the invention as defined by the claims.

What is claimed is:

1. A linear actuator, comprising:
   a housing comprising a proximal end and a distal end, and defining a central cavity extending axially through the housing;
   a piston arranged to slide within the central cavity of the housing;
   a piston tube having a first portion slidably positioned axially in the housing and a second portion extending outwardly from the distal end of the housing;
   an elongated rotatable screw positioned axially within the central cavity of the housing and connected to the piston;
   a nut positioned within the housing and mounted about the elongated rotatable screw, wherein the nut is configured to engage with the elongated rotatable screw and move axially within the housing as the elongated rotatable screw rotates; and
   a spring positioned around the elongated rotatable screw, the spring positioned within the housing between the nut and the piston tube and contacting the nut;
   wherein the spring is configured to bias the piston tube away from the nut.

2. The linear actuator of claim 1, wherein the elongated rotatable screw comprises a plurality of screw threads on its outer surface, and further wherein the nut comprises a plurality of nut threads on its inner surface, the plurality of screw threads and the plurality of nut threads configured to be complementary to each other.

3. The linear actuator of claim 1, further comprising an adjustment knob mounted on and extending into the housing, wherein the adjustment knob is configured to interface with the elongated rotatable screw and enable rotation of the elongated rotatable screw.

4. The linear actuator of claim 3, wherein the adjustment knob and the elongated rotatable screw interface using a first gear coupled to the adjustment knob and a second gear coupled to the elongated rotatable screw.

5. The linear actuator of claim 1, wherein the piston tube comprises a hydraulic component, the hydraulic component comprising the piston rotatably coupled to the elongated rotatable screw.

6. The linear actuator of claim 1, further comprising a mechanical lock.

7. The linear actuator of claim 1, further comprising a first retainer comprising a proximal end and a distal end, wherein the first retainer is positioned within the housing between the spring and the piston tube, the first retainer defining an opening configured to receive the spring therethrough to retain the spring at its distal end.

8. The linear actuator of claim 7, further comprising:
   a second retainer comprising a proximal end and a distal end, wherein the second retainer is positioned within the housing and around the elongated rotatable screw; and
   a second spring positioned around the elongated rotatable screw, the second spring positioned within the housing between the proximal end of the housing and the second retainer;
   wherein the second spring is configured to bias the second retainer away from the proximal end of the housing, and wherein the second retainer is configured to interface with an outer wall of a proximal end of the first retainer to enable the first retainer to exert a force on the second spring.

9. The linear actuator of claim 1, further comprising a spline positioned about the elongated rotatable screw and configured to selectively allow rotation of the elongated rotatable screw.

10. A linear actuator, comprising:
    a housing comprising a proximal end and a distal end, and defining a central cavity extending axially through the housing;
    a piston arranged to slide within the central cavity of the housing;
    a piston tube having a first portion slidably positioned axially in the housing and a second portion extending outwardly from the distal end of the housing;
    an elongated rotatable screw positioned axially within the central cavity of the housing and connected to the piston;
    a cylindrical nut positioned within the housing and mounted about the elongated rotatable screw, wherein the cylindrical nut is configured to move axially within the housing as the elongated rotatable screw rotates;

a first spring positioned around the elongated rotatable screw, the first spring positioned within the housing between the cylindrical nut and the piston tube, wherein the first spring is configured to bias the piston tube away from the cylindrical nut;

a first retainer comprising a proximal end and a distal end, wherein the first retainer is positioned within the housing between the first spring and the piston tube, the first retainer defining an opening configured to receive the first spring therethrough to retain the first spring at its distal end;

a second retainer comprising a proximal end and a distal end, wherein the second retainer is positioned within the housing and around the elongated rotatable screw; and a second spring positioned around the elongated rotatable screw, the second spring positioned within the housing between the proximal end of the housing and the second retainer, wherein the second spring is configured to bias the second retainer away from the proximal end of the housing, and wherein the second retainer is configured to interface with an outer wall of a proximal end of the first retainer to enable the first retainer to exert a force on the second spring.

11. The linear actuator of claim 10, wherein the elongated rotatable screw comprises a plurality of screw threads on its outer surface, and further wherein the cylindrical nut comprises a plurality of nut threads on its inner surface, the plurality of screw threads and the plurality of nut threads configured to be complementary to each other.

12. The linear actuator of claim 10, further comprising an adjustment knob mounted on and extending into the housing, wherein the adjustment knob is configured to interface with the elongated rotatable screw and enable rotation of the elongated rotatable screw.

13. The linear actuator of claim 12, wherein the adjustment knob and the elongated rotatable screw interface using a first gear coupled to the adjustment knob and a second gear coupled to the elongated rotatable screw.

14. The linear actuator of claim 10, wherein the piston tube comprises a hydraulic component, the hydraulic component comprising a piston rotatably coupled to the elongated rotatable screw.

15. The linear actuator of claim 10, further comprising a mechanical lock.

* * * * *